(12) United States Patent
Murai et al.

(10) Patent No.: US 7,323,654 B2
(45) Date of Patent: Jan. 29, 2008

(54) ELECTRIC DISCHARGE MACHINING APPARATUS

(75) Inventors: Masao Murai, Gotenba (JP); Yasuo Nakashima, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 11/498,838

(22) Filed: Aug. 4, 2006

(65) Prior Publication Data

US 2007/0034609 A1    Feb. 15, 2007

(30) Foreign Application Priority Data

Aug. 10, 2005   (JP)   ............... 2005-231912

(51) Int. Cl.
  *B23H 1/00*   (2006.01)
  *B23H 7/18*   (2006.01)

(52) U.S. Cl. .................. 219/69.16

(58) Field of Classification Search ............ 219/69.16, 219/69.13, 69.18, 69.19, 69.12
See application file for complete search history.

(56) References Cited

U.S. PATENT DOCUMENTS

| | | | | |
|---|---|---|---|---|
| 3,816,692 | A | * | 6/1974 | Ratmansky ............... 219/69.13 |
| 4,267,423 | A | * | 5/1981 | Bell et al. ................. 219/69.13 |
| 4,361,745 | A | * | 11/1982 | Rupert et al. ............. 219/69.16 |
| 4,760,233 | A | * | 7/1988 | Obara ....................... 219/69.16 |
| 4,864,091 | A | * | 9/1989 | Boccadoro ................ 219/69.16 |
| 6,980,879 | B2 | | 12/2005 | Kurihara et al. |
| 7,019,246 | B2 | | 3/2006 | Kurihara et al. |
| 7,039,490 | B2 | | 5/2006 | Kurihara et al. |
| 2001/0002104 | A1 | | 5/2001 | Akamatsu |
| 2002/0117478 | A1 | | 8/2002 | Yamada et al. |

FOREIGN PATENT DOCUMENTS

| | | |
|---|---|---|
| EP | 0551091 | 7/1993 |
| JP | 4-289024 A * | 10/1992 |
| JP | 2002-254250 | 9/2002 |
| JP | 2004-283968 | 10/2004 |

OTHER PUBLICATIONS

Extended European Search Report mailed Dec. 12, 2006 in corresponding European Patent Application No. 06254014-1262.

* cited by examiner

*Primary Examiner*—Geoffrey S. Evans
(74) *Attorney, Agent, or Firm*—Staas & Halsey LLP

(57) ABSTRACT

An electric discharge machining apparatus capable of precisely detecting the electric discharge in a case of performing machining by minute machining energy such as in finish machining. A voltage is applied between a tool electrode and a workpiece by repeating ON/OFF of a switching element to charge a stray capacitance between the electrodes to cause electric discharge between the electrodes by the charged voltage. The electric discharge between the electrodes in the electric discharge machining by the minute machining energy is detected. The current between the electrodes is detected by integrating an output of a sensor coil. An offset component superposed in the output of the integrator by a low-pass filter is extracted. The extracted offset component is eliminated from the output of the integrator by a differential amplifier. An output of the differential amplifier is compared with a reference value to detect the electric discharge.

1 Claim, 2 Drawing Sheets

ELECTRIC DISCHARGE MACHINING APPARATUS

BACKGROUND OF THE INVENTION

1. Field of the Invention

The present invention relates to an electric discharge machining apparatus for machining a workpiece by applying voltage between a tool electrode and a workpiece to cause an electric discharge in between, and in particular to detection of the electric discharge in a case where an electric discharge energy is relatively low, such as in finish machining.

2. Description of Related Art

The electric discharge machining apparatus performs machining by electric discharge produced by applying voltage between a tool such as a wire serving as one electrode and a workpiece serving as the other electrode. In the electric discharge machining, it is necessary to make relative motion of the tool electrode and the workpiece such that a distance between the electrodes is kept constant. There has been generally carried out an average voltage servo in which an average machining voltage between the electrodes is detected and the tool electrode is feed relative to the workpiece such that the average machining voltage is constant. However, the average machining voltage varies in dependence on degree of contamination of machining fluid intervened between the electrodes and does not precisely reflect the distance between the electrodes and thus the average voltage servo has a problem in feed control for machining of high precision.

Therefore, it has been proposed to detect individual electric discharges and controlling the machining feed in accordance with the number of electric discharges (see JP 2004-283968A and JP2002-254250A).

Meanwhile, there has been carried out a method in the finish machining where stray capacitance in electric discharge cables, etc. is charged without supplying the machining current directly from a machining power source and the machining is performed by discharging an electric current from the stray capacitance so as to restrict a machining energy to a minimum value.

FIG. 1 shows an example of a power supply circuit for performing machining by discharging energy charged in the stray capacitance to be applied between the tool electrode and the workpiece.

In FIG. 1, E denotes a direct current power source, SW denotes a switching element, R denotes a current restriction element such as a resistor, 1 denotes a tool such as a wire serving as one electrode, 2 denotes a workpiece serving as the other electrode, C denotes a stray capacitance produced between the two electrodes by power cables connected to the tool electrode 1 and the workpiece 2, etc. The switching element SW is periodically turned ON/OFF to charge the stray capacitance by electric current from the power source E through the current restricting element R, and the charged voltage is applied between the electrodes to cause electric discharge in between. Since the switching element SW is periodically turned ON and OFF, it is prevented that arc discharge maintains by the charging current from the power source E when the electric discharge occurs between the electrodes.

FIG. 2 shows an operation of the power supply circuit shown in FIG. 1.

The switching element SW repeats ON/OFF periodically and while the switching element SW is turned ON, the stray capacitance C between the electrodes is charged to raise a voltage Vg between the electrodes. While the switching element SW is turned OFF, the voltage Vg between the electrodes decreases due to a leakage current between the electrodes. Thus, the stray capacitance C is gradually charged by the periodic ON/OFF of the switching element SW to raise a charged voltage and thus the voltage Vg between the electrodes. Then, an electric discharge occurs between the tool electrode 1 and the workpiece 2 to flow an electric discharge current by a discharge of the energy accumulated in the stray capacitor so that the voltage Vg between the electrodes is lowered. The above operations are repeatedly performed such that the voltage Vg between the electrodes in the form of saw-tooth is produced.

Since the inter-electrode voltage Vg is quickly lowered to an arc voltage when an electric discharge occurs between the electrodes, in a case of rough machining where the constant machining voltage is applied between the electrodes until occurrence of the electric discharge, the electric discharge is detected by monitoring the voltage Vg between the electrodes based on comparison of the detected voltage Vg with a reference value. However, in the finish machining utilizing the stray capacitance so as to restrict the machining energy to a minimum value, the voltage Vg between the electrodes varies in the form of saw-tooth and a value of the voltage Vg at the occurrence of the electric discharge is not constant, it is difficult to detect the occurrence of the electric discharge based on the drop of the voltage Vg between the electrodes.

Therefore, it is considered to detect the electric discharge based on the electric discharge current, as shown in JP2002-254250A. In general, there is a difference more than one order between the charging current and the leakage current of the stray capacitance and the electric discharge current, and therefore it is possible to detect the electric discharge based on the electric discharge current.

In order to detect a high-frequency current of the electric discharge, there are generally known a hollow coil such as the Rogowskii coil and a coil with a core such as a ferrite core in which a greater gain can be get. Since the above coils detect the electric discharge current in the form of the AC coupling, an offset component having an average value of zero is superposed on a measured value to make difficulty in determining occurrence of the electric discharge by the low-level current.

FIG. 6 shows a result of measurement of the current between the electrodes by the sensor coil. In FIG. 6, the graph 6A shows a voltage Vg between the electrodes and the graph 6B shows a measured value (after integration) of the current between the electrodes by the sensor coil. An axis of abscissa represents time having a division of 20.0 μs and an axis of ordinate represents the voltage between electrodes having a division of 20.0 V (in the upper graph) and the current between electrodes having a division of 100 mV (in the lower graph). As shown in the graph 6B, a measured value of current between electrodes contains an offset component of low-frequency interposed therein and detected as being waving. In the example shown in FIG. 6, positive voltages and negative voltages are alternately applied between the electrodes so as to prevent electric corrosion in the case of using machining fluid of electrolyte such as water.

In the measurement of the current between the electrodes by the coil, it is difficult to detect the electric discharge by the current of low level since the offset component is superposed in the measured value due to the AC coupling, as described above. On the other hand, a current measuring device using the Hall element for detecting the electric discharge current in the form of a DC coupling does not have the above problem but is not suitable for the detection of high frequency current in the finish machining since it has a low response characteristic.

SUMMARY OF THE INVENTION

The present invention provide an electric discharge machining apparatus capable of precisely detecting an electric discharge between electrodes in the case of performing electric discharge machining with minute machining energy.

The electric discharge machining apparatus of the present invention performs machining by periodically applying a voltage between a tool electrode and a workpiece irrespectively of occurrence of electric discharge and by providing relative machining feed to the tool electrode and the workpiece. The electric discharge machining apparatus comprises: a sensor coil for detecting an electric discharge current; an integrator for integrating an output of the sensor coil; eliminating means for eliminating an offset component contained in an output of the integrator; and a comparator for comparing an output of the eliminating means with a predetermined value to detect an occurrence of the electric discharge, so that the machining feed is controlled based on the detected electric discharge.

The eliminating means may comprise a low-pass filter for extracting the offset component from the output of the integrator, and a differential amplifier for eliminating the offset component extracted by the low-pass filter from the output of the integrator.

The eliminating means may comprise a high-pass filter for extracting an electric discharge current component by eliminating the offset component in the output of the integrator.

With the above arrangements, the current between the electrodes is obtained by eliminating the offset component contained in the differentiated value of the output of the sensor coil, the electric discharge can be precisely detected in the case where the electric discharge energy is relatively low.

DETAILED DESCRIPTION

Figure 1:
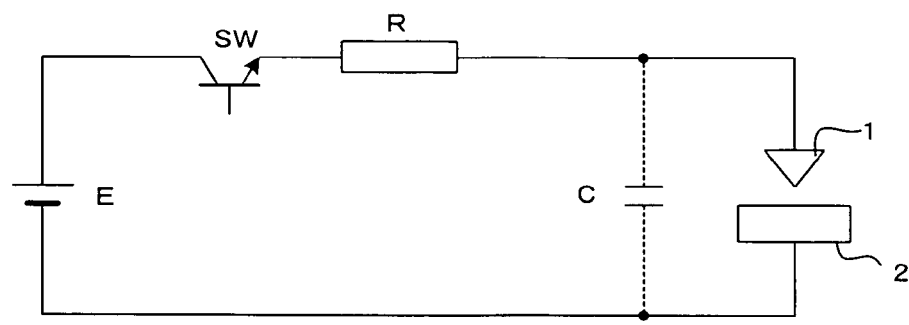
FIG. 1 is a diagram of a power supply circuit for applying a machining voltage using a stray capacitance between electrodes employed in an embodiment of the present invention.
Figure 2:
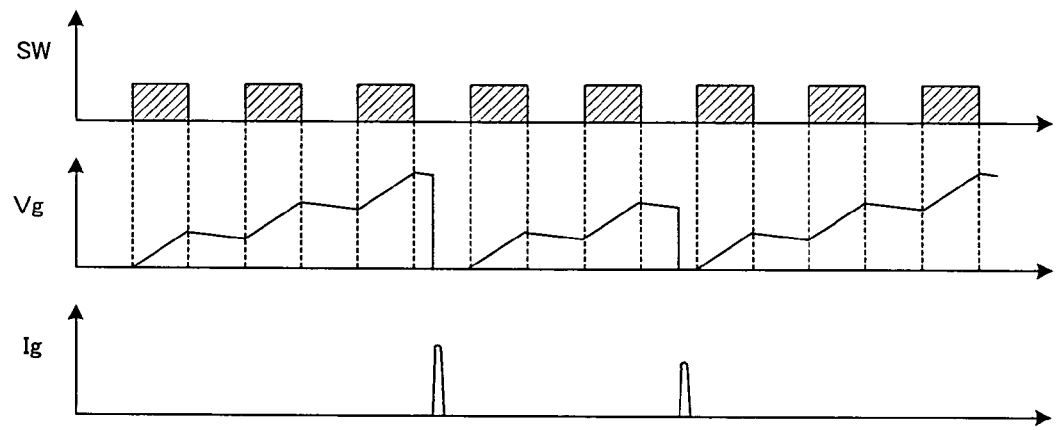
FIG. 2 is a diagram showing an operation of the power supply circuit.

An electric discharge machining apparatus according to an embodiment of the present invention has the power supply circuit suitable to perform finish machining, as shown in FIG. 1, in which a voltage of a power source E is applied between a tool electrode 1 such as a wire and a workpiece 2 through a current restricting element R by turning ON/OFF a switching element SW, to charge a stray capacitance C between the electrodes, the charged voltage is applied between the electrodes to cause electric discharges to machine the workpiece, which is suitable for the finish machining. According to the present invention, a sensor coil is provided in the electric discharge circuit so as to securely and precisely detecting an electric discharge current using the sensor coil.

Figure 3:
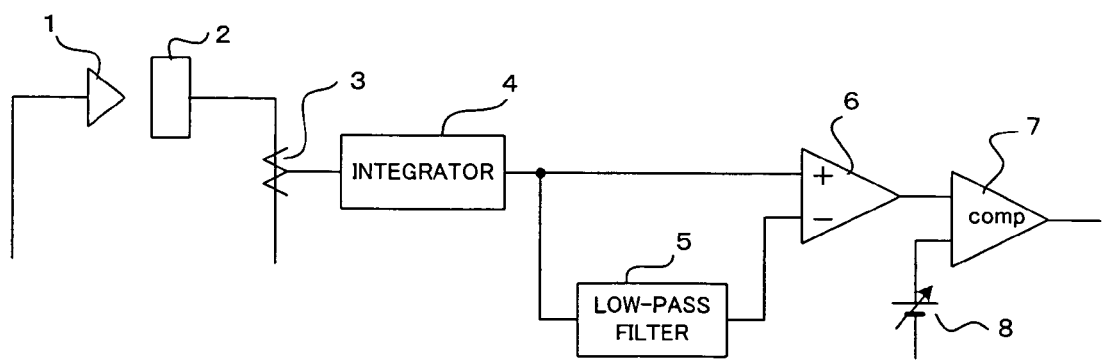
FIG. 3 is a diagram of an electric discharge current detection circuit according the embodiment of the present invention.

FIG. 3 shows an embodiment of an electric discharge current detecting circuit. An electric discharge current flowing between the tool electrode 1 and the workpiece 2 is measured by a sensor coil 3. Since an output of the sensor coil 3 represents a differentiated value of the electric discharge current, the output is integrated by an integrator 4 to be converted into the current value. As a frequency of offset component contained in an output of the integrator 4 is sufficiently lower than a frequency of the electric discharge current, the offset component of the output is extracted by a low-pass filter 5. In this example, a cut-off frequency of the low-pass filter 5 is set to 72 kHz. The offset component outputted from the low-pass filter 5 is subtracted from the output of the integrator 4 by a differential amplifier 6 so that the offset component is eliminated. An output of the differential amplifier 6 in which the offset component is eliminated is compared with a reference value 8 by a comparator 7 and when the output of the differential amplifier 6 is greater than the reference value, an electric discharge signal pulse is outputted.

Figure 4:
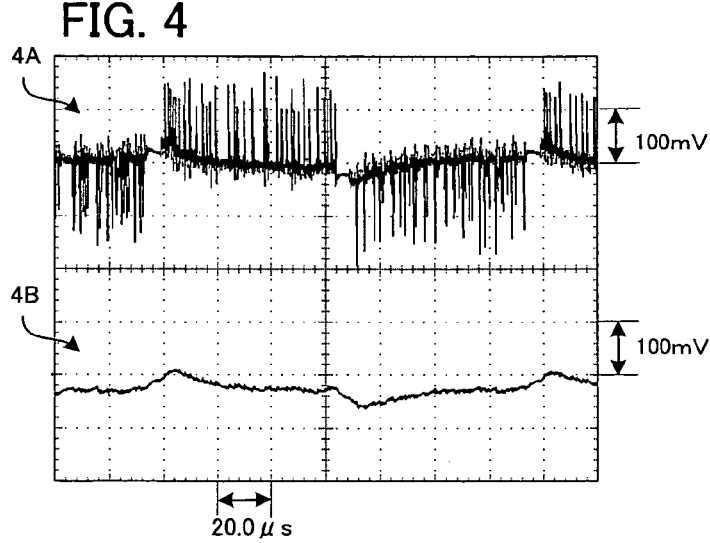
FIG. 4 shows graphs of outputs of an integrator and a low-pass filter in the electric discharge current detection circuit.
Figure 5:
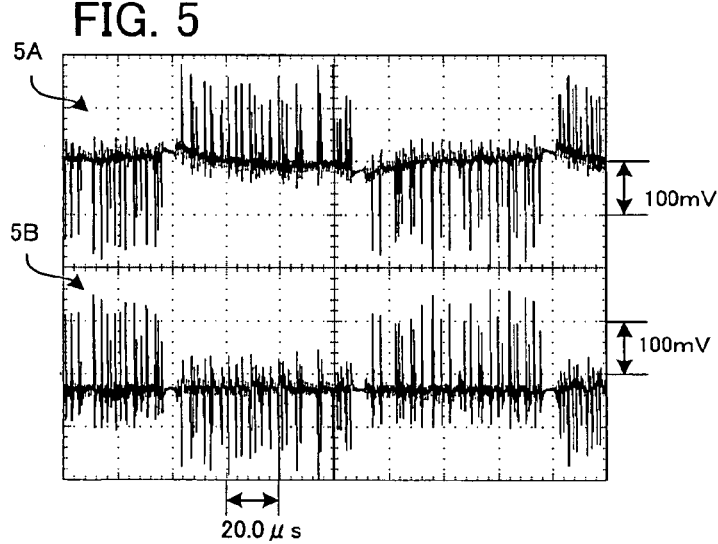
FIG. 5 shows graphs of outputs of the integrator and a differential amplifier in the electric discharge current detection circuit.
Figure 6:
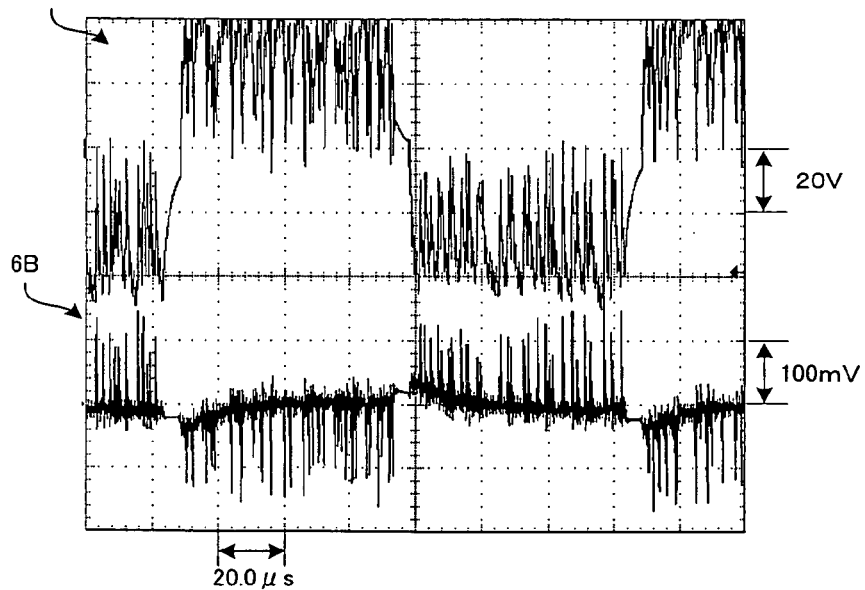
FIG. 6 shows graphs of the voltage between electrodes and the detected current between electrodes in detecting the electric discharge current by a coil.

A graph 4A in FIG. 4 and a graph 5A in FIG. 5 show the output of the integrator 4, and a graph 4B in FIG. 4 shows an output of the low-pass filter 5. A graph 5B in FIG. 5 shows an output of the differential amplifier 6. The offset component as shown in the graph 4B is eliminated from the output of the integrator 4 (graphs 4A and 5A) containing the offset component superposed therein so that a measured waveform of the current between the electrodes is obtained as shown in the graph 5B in FIG. 5. Thus, occurrence of the electric discharge is precisely detected by comparing the output of the differential amplifier 6 with the reference value 8. The detected electric discharges are used for controlling of the relative machining feed of the tool electrode 1 and the workpiece 2, for example in accordance with the number of electric discharges.

In the above embodiment, the low-pass filter 5 and the differential amplifier 6 are used in order to eliminate the offset component from the output of the integrator 4, it may be configured such that the output of the integrator 4 is inputted to a high-pass filter to eliminate the offset component so that the current between the electrodes is obtained.

What is claimed is:

1. An electric discharge machining apparatus for performing machining by periodically applying a voltage between a tool electrode and a workpiece irrespectively of occurrence of electric discharge and by providing relative machining feed to the tool electrode and the workpiece, comprising:

a sensor coil for detecting an electric discharge current;

an integrator for integrating an output of said sensor coil;

eliminating means for eliminating an offset component contained in an output of said integrator comprising a low-pass filter for extracting the offset component from the output of said integrator, and a differential amplifier for eliminating the offset component extracted by said low-pass filter from the output of said integrator; and a comparator for comparing an output of said eliminating means with a predetermined value to detect an occurrence of the electric discharge, so that the machining feed is controlled based on the detected electric discharge.

* * * * *